United States Patent
Di Mola et al.

(10) Patent No.: US 11,159,240 B1
(45) Date of Patent: Oct. 26, 2021

(54) POWER EFFICIENT AND SCALABLE CO-PACKAGED OPTICAL DEVICES

(71) Applicant: Juniper Networks, Inc., Sunnyvale, CA (US)

(72) Inventors: Domenico Di Mola, Morgan Hill, CA (US); Steven B. Alleston, Los Gatos, CA (US); Zhen Qu, Sunnyvale, CA (US); Ryan Holmes, Nepean (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/038,453

(22) Filed: Sep. 30, 2020

(51) Int. Cl.
  *H04B 10/40* (2013.01)
  *H04L 27/34* (2006.01)
  *H04L 1/00* (2006.01)

(52) U.S. Cl.
  CPC ........... *H04B 10/40* (2013.01); *H04L 1/0041* (2013.01); *H04L 1/0045* (2013.01); *H04L 27/34* (2013.01)

(58) Field of Classification Search
  CPC ..... H04B 10/40; H04L 1/0041; H04L 1/0045; H04L 27/34
  USPC ........................................................ 398/135
  See application file for complete search history.

(56) References Cited

U.S. PATENT DOCUMENTS

| | | | |
|---|---|---|---|
| 9,337,993 B1* | 5/2016 | Lugthart | H04L 7/0054 |
| 9,553,670 B2* | 1/2017 | Nagarajan | H04J 14/02 |
| 9,874,688 B2 | 1/2018 | Doerr et al. | |
| 9,967,048 B1 | 5/2018 | Salsi | |
| 10,284,323 B2 | 5/2019 | Salsi | |
| 10,826,613 B1* | 11/2020 | Liang | G02B 6/425 |
| 2015/0365177 A1* | 12/2015 | Blumenthal | H04B 10/0793 398/9 |
| 2016/0013866 A1 | 1/2016 | Doerr | |
| 2018/0041280 A1* | 2/2018 | Elahmadi | H04L 1/0045 |
| 2018/0069632 A1* | 3/2018 | Voois | H04B 10/58 |
| 2018/0198547 A1* | 7/2018 | Mehrvar | H04B 10/616 |
| 2019/0243164 A1* | 8/2019 | Nelson | H04B 10/588 |

OTHER PUBLICATIONS

"Engineers Garage", https: web.archive.org web 20200620175501 https: www.engineersgarage.com , (Jun. 20, 2020), 14 pgs.
"European Application Serial No. 20216469.5, Extended European Search Report dated Jun. 17, 2021", 14 pgs.

(Continued)

*Primary Examiner* — Dalzid E Singh
(74) *Attorney, Agent, or Firm* — Schwegman Lundberg & Woessner, P.A.

(57) ABSTRACT

A co-packaged optical-electrical chip can include an application-specific integrated circuit (ASIC) and a plurality of optical modules, such as optical transceivers. The ASIC and each of the optical modules can exchange electrical signaling via integrated electrical paths. The ASIC can include Ethernet switch, error correction, bit-to-symbol mapping/demapping, and digital signal processing circuits to pre-compensate and post-compensate channel impairments (e.g., inter-channel/intra-channel impairments) in electrical and optical domains. The co-packaged inter-chip interface can be scaled to handle different data rates using spectral efficient signaling formats (e.g., QAM-64, PAM-8) without adding additional data lines to a given design and without significantly increasing the power consumption of the design.

20 Claims, 7 Drawing Sheets

(56) References Cited

OTHER PUBLICATIONS

Li, Hao, "A 112 Gb s PAM4 Silicon Photonics Transmitter With Microring Modulator and CMOS Driver", Journal Of Lightwave Technology, IEEE, USA, vol. 38, No. 1, (Jan. 1, 2020), 3 pages.
Minkenberg, Cyriel, "Reimagining datacenter topologies with integrated silicon photonics", Journal Of Optical Communications And Networking, Institute Of Electrical And Electronics Engineers, US, vol. 10, No. 7, (Jul. 1, 2018), 14 pages.

* cited by examiner

US 11,159,240 B1

POWER EFFICIENT AND SCALABLE CO-PACKAGED OPTICAL DEVICES

TECHNICAL FIELD

The present disclosure generally relates to optical and electrical devices and more particularly to power efficient and scalable co-packaging of optical devices.

BACKGROUND

The growth of network traffic has driven a demand for higher capacity and lower power consumption optical devices. One approach for increasing capacity and lowering power requirements includes moving the optical components of the chips (e.g., optical transceivers) closer to the Ethernet application specific integrated circuit (ASIC) and integrating some of the integrated circuit (IC) components on a host board connected to the chip. In some approaches, the Ethernet ASIC and optical/electrical components can be co-packaged on a single chip. While closely integrating the electrical and optical components can in theory improve the chip, these co-packaged approaches are difficult to design and difficult to reconfigure or scale as the amount of data to be processed increases.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

As discussed, co-packaged optical-electrical designs can improve chip functionality, but power efficient configurations for such devices can be difficult to design and scale. One challenge in designing co-packaged optical-electrical devices includes designing an electrical interface to handle high rates of data transferred between the Ethernet ASIC of the chip and the co-packaged optical transceivers. One approach for implementing such an interface includes an extremely short reach (XSR) interface. As the amount of data to be handled increases, the aggregate throughput of the XSR interface has to be scaled accordingly. An electrical interface can be scaled in a serial direction, e.g., increasing the lane rate; or in parallel direction, e.g., increasing the number of electrical lanes. Both approaches may bring severe lane crosstalk to keep pace as the capacity soars. While integrating additional transceivers around the Ethernet ASIC may improve the scaling, under size restrictions of CPO architectures, the chip topology remains a difficult design challenge. For example, if the chip size is increased to fit more transceivers, then previously obtainable benefits brought by shortening the electrical interface will be compromised. As such, the development of next generation CPO systems will encounter bottlenecks in the foreseeable future using the conventional approaches.

To this end, an improved co-packaged hybrid interface can be implemented to increase inter-chip data rates by integrating digital signal processing and error correction modules into the Ethernet ASIC and implementing spectral efficient transfers of data between the ASIC and the transceivers (e.g., PAM/QAM signaling between the ASIC and CPO modules). Improvements include significant power savings and cost savings due to reduced electrical components being included in a given design, inter-channel impairment mitigation by multi-in-multi-out (MIMO) processing, and increased scalability enabled by higher spectrally efficient formats (e.g., increasing the data rate by using PAM-16 instead of PAM-4).

Figure 1A:
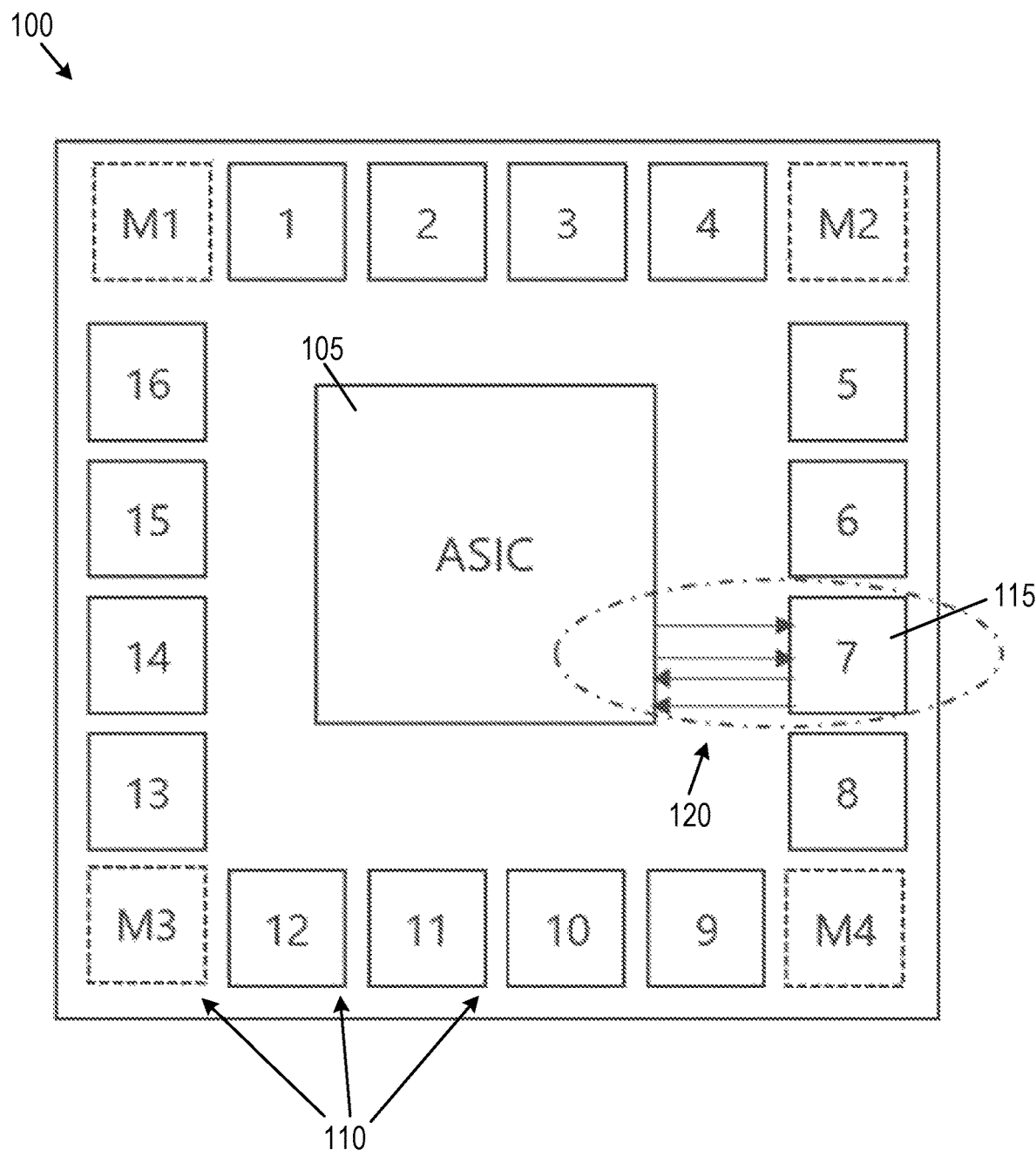
FIG. 1A shows an opto-ASIC co-packaged architecture chip, according to some example embodiments.

FIG. 1A shows an opto-ASIC co-packaged architecture chip 100, according to some example embodiments. The ASIC 105 is an electrical data processing circuit, such as a switch ASIC. The opto-ASIC co-packaged architecture chip 100 includes a plurality of co-packaged optical transceivers 110, such as transceiver 115 (e.g., an optical transceiver) that can receive electrical data for transmission and receive optical signal for processing from external devices (e.g., via an optical network). Although a switch ASIC and optical transceiver CPO modules are discussed here as an example, it is appreciated that different sorts of ASICs and co-packaged optical modules can be similarly implemented, according to some example embodiments.

In the illustrated example, the ASIC 105 sends and receives data to the co-packaged optical transceivers 110 using an electrical interface, such as the electrical interface 120 (e.g., integrated electrical paths) connecting the ASIC 105 with the transceiver 115. In some example embodiments, the opto-ASIC co-packaged architecture chip 100 receives light for modulation from one or more external light sources, such as an external laser. Further details of a co-packaged architectures that can be implemented using the power efficient and scalable architectures is discussed in application Ser. No. 16/990,348, titled "External Laser Enabled Co-Packaged Optics Architectures," filed on Aug. 11, 2020, which is hereby incorporated by reference in its entirety.

Figure 1B:
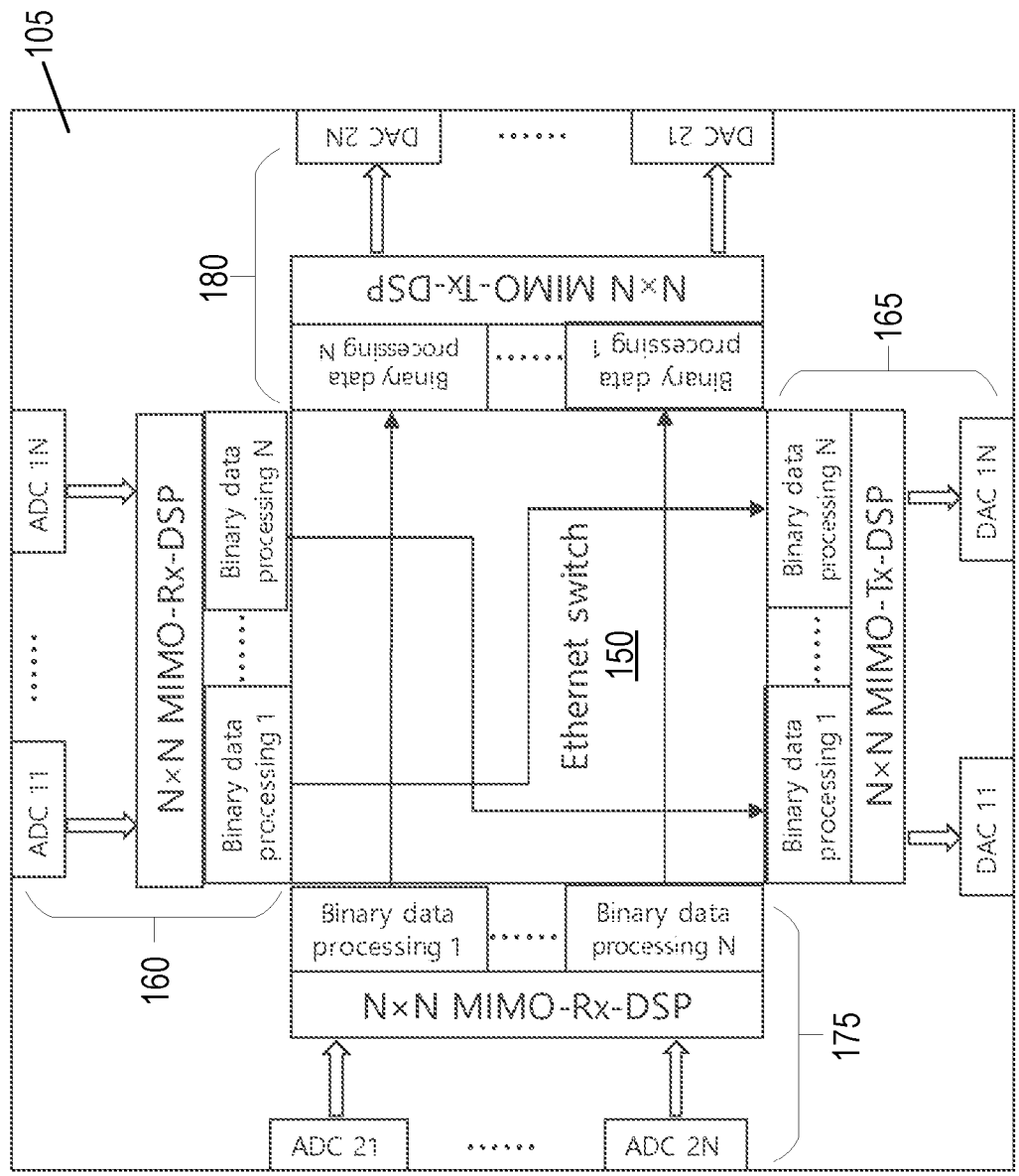
FIG. 1B shows an example ASIC architecture, according to some example embodiments.

FIG. 1B shows an example architecture of the ASIC 105, according to some example embodiments. In the example illustrated, the Ethernet switch circuit 150 is configured to transmit data from a top-side receiver ASIC portion 160 to a bottom-side transmitter ASIC portion 165; and further from a left-side receiver ASIC portion 175 to a right-side receiver ASIC portion 180, although it is appreciated that the Ethernet switch circuit 150 can be reconfigured to connect the any of the receivers to any of the transmitters, depending on the data being processed (e.g., the Ethernet switch circuit 150 can be configured to transmit data from the left-side receiver ASIC portion 175 to the bottoms-side transmitter ASIC portion 165, etc.). Each of the receiver portions include a number I/O ports (e.g., ADCs for the receivers, DACs for the transmitters) that depend on the number of co-packaged optical transceivers and the electrical interface types, according to some example embodiments. Further, each of the receiver and transmitter portions can include a number of data processing blocks (e.g., binary data processing 1 to binary data processing N) that can include binary data circuitry for binary data processing (e.g., error correction, symbol to binary converters, etc.).

In the example illustrated, the ASIC 105 includes Multiple-Input Multiple-Output (MIMO) DSPs to correct optical and electrical distortion across the channels. In conventional approaches, the optical transceivers are isolated physically and the DSPs in each transceiver are subsequently also independent and isolated and cannot correct inter-channel impairments, such as a portion of the electrical/optical signal jumping lanes (e.g., electrical or optical crosstalk, signal from transmitter Tx1 lane jumping to Tx2 lane). In contrast, the architecture of ASIC 105 includes MIMOs that do not have physical barriers from one another but rather are included with a single circuit layout of ASIC 105, thereby enabling the MIMO DSPs to operate in concert to mitigate inter-channel impairments.

Figure 2:
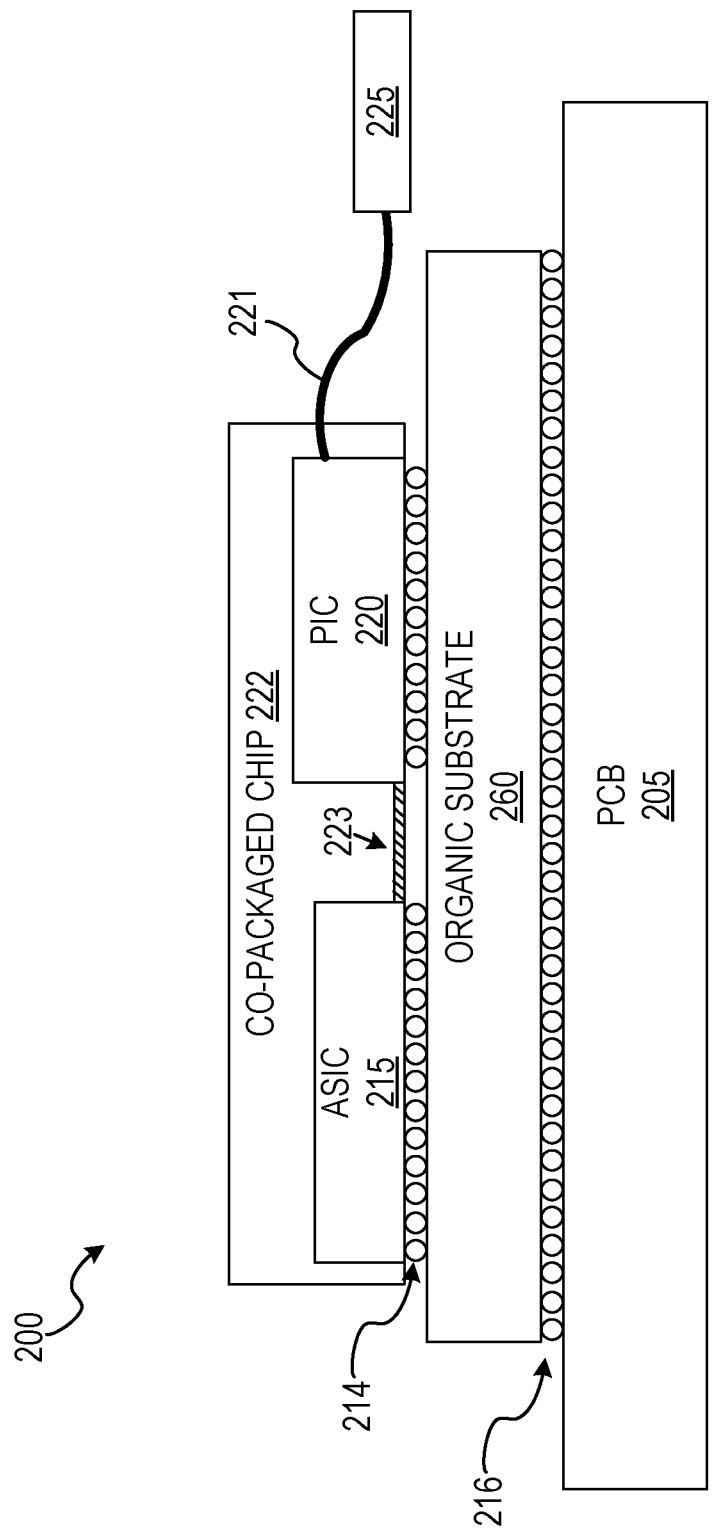
FIG. 2 shows a side view of an optical-electrical device including one or more optical devices, according to some example embodiments.

FIG. 2 shows a side view of an optical-electrical device 200 (e.g., opto-ASIC co-packaged architecture chip 100) including one or more optical devices, according to some example embodiments. In illustrated embodiment, the optical-electrical device 200 is shown to include a printed circuit board (PCB) substrate 205, organic substrate 260, and a co-packaged architecture chip 222, which includes an application-specific integrated circuit 215 (e.g., ASIC 105) and PIC 220 (e.g., the co-packaged optical transceivers 110).

In some example embodiments, the PIC 220 includes silicon on insulator (SOI) or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material. III-V semiconductors have elements that are found in group III and group V of the periodic table (e.g., Indium Gallium Arsenide Phosphide (InGaAsP), Gallium Indium Arsenide Nitride (GainAsN)). The carrier dispersion effects of III-V-based materials may be significantly higher than in silicon-based materials, as electron speed in III-V semiconductors is much faster than that in silicon. In addition, III-V materials have a direct bandgap, which enables efficient creation of light from electrical pumping. Thus, III-V semiconductor materials enable photonic operations with an increased efficiency over silicon for both generating light and modulating the refractive index of light. Thus, III-V semiconductor materials enable photonic operation with an increased efficiency at generating light from electricity and converting light back into electricity.

The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides.

Magneto-optic (MO) materials allow heterogeneous PICs to operate based on the MO effect. Such devices may utilize the Faraday Effect, in which the magnetic field associated with an electrical signal modulates an optical beam, offering high bandwidth modulation, and rotates the electric field of the optical mode, enabling optical isolators. Said MO materials may comprise, for example, materials such as iron, cobalt, or yttrium iron garnet (YIG). Further, in some example embodiments, crystal substrate materials provide heterogeneous PICs with a high electro-mechanical coupling, linear electro-optic coefficient, low transmission loss, and stable physical and chemical properties. Said crystal substrate materials may comprise, for example, lithium niobate (LiNbO3) or lithium tantalate (LiTaO3).

In the example illustrated, the PIC 220 exchanges light with an external light source 225 via an optical fiber 221. The optical fiber 221 can couple with the PIC 220 using a prism, grating, or lens, according to some example embodiments. The optical components of PIC 220 (e.g., optical modulators, optical switches) are controlled, at least in part, by control circuitry included in ASIC 215. Both ASIC 215 and PIC 220 are shown to be disposed on copper pillars 214, which are used for communicatively coupling the PICs via organic substrate 260. PCB substrate 205 is coupled to organic substrate 260 via ball grid array (BGA) interconnect 216 and may be used to interconnect the organic substrate 260 (and thus, ASIC 215 and PIC 220) to other components of the optical-electrical device 200 not shown (e.g., interconnection modules, power supplies, etc.). Additionally, in some example embodiments, the co-packaged architecture chip 222 includes integrated electrical circuit paths 223 that can interconnect the ASIC and the PIC 220 without use of the connections through the organic substrate 260.

Figure 3:
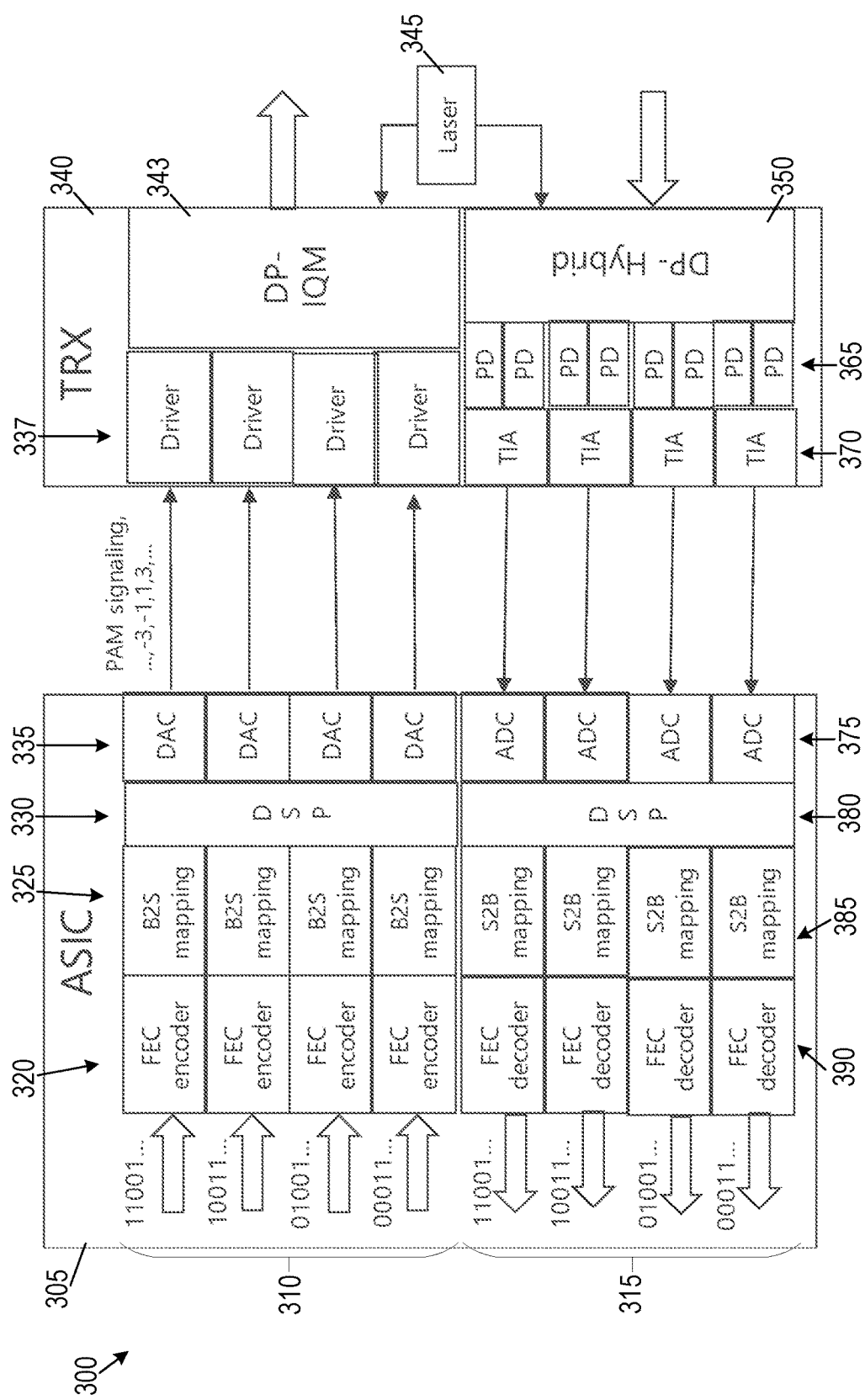
FIG. 3 shows an example pulse amplitude modulation (PAM) signaling based electrical interface architecture, according to some example embodiments.

FIG. 3 shows an example co-packaged optical centralized digital integration (CDI)-PAM architecture 300 implementing m-ary pulse amplitude modulation (MPAM) signaling, according to some example embodiments. In the illustrated embodiments, the ASIC 305 is an example implementation of ASIC 105 or ASIC 215 that is connected to CPO module 340 (e.g., an optical transceiver, transceiver 115 in FIG. 1, PIC 220 in FIG. 2) via electrical paths (e.g., integrated electrical circuit paths 223, electrical connections through the copper pillars 214 and organic substrate 260), over which data is transmitted in PAM signaling format. As illustrated, the ASIC 305 includes a transmitter portion 310 and receiver portion 315, each having four binary lanes that can carry a PAM information (e.g., PAM-4, PAM-16). In the transmitter portion 310, each data line undergoes forward error correction (FEC) encoding by the FEC encoders 320 and is converted from binary to symbols by binary-to-symbol mapping blocks 325. Each of the data lines in the transmitter portion 310 then undergoes digital signal processing by a digital signal processing module 330. In some example embodiments, the digital signal processing module 330 includes one or more data processing blocks to improve the data quality of each lane, such as four independent equalizers or one MIMO (e.g., M=4, as in FIG. 3) DSP block. Each of the four lanes of data in the transmitter portion 310 undergoes conversion from digital data to analog signal by a plurality of digital-to-analog converters 335 (DACs). For example, each data line is converted from digital PAM-4 data to analog-electrical PAM-4 signal. The PAM signal (e.g., PAM signaling −3, −1, 1, 3) is then transferred from the ASIC 305 to the CPO module 340 using electrical pathways in the co-packaged architecture (e.g., integrated electrical circuit paths 223).

The CPO module 340 implements one or more optical modulators to modulate a plurality of optical beams for transmission out of the opto-ASIC co-packaged architecture chip 100. For example, a modulator driver 337 for each data line uses the PAM electrical signaling to drive an optical modulator 343 (e.g., a dual polarization IQ modulator (DP-IQM)) to generate modulated DP-QAM light for transmission. In the illustrated example, a laser 345 (e.g., an external laser, a laser integrated in the CPO module 340 formed from III-V materials) can generate the light for modulation and transmission, and additionally provide the same light for demodulation by the receiver components in a coherent configuration.

The CPO module 340 can receive modulated light for processing (e.g., receive DP-QAM light from an optical network for processing by the ASIC 305). In some example embodiments, the modulated light is received by an optical hybrid 350 (e.g., a dual polarization and 90 degree optical hybrid). A plurality of photodetectors 365 (e.g., photodiodes) to convert the light to electrical signal (e.g., differential signal, with a pair of photodiodes processing each data line). The electrical signal is then amplified by a plurality of transimpedance amplifiers 370 (TIAs) for transmission to the ASIC 305 in the PAM signaling format.

The ASIC 305 receives the electrical PAM data and converts it from analog to digital using a plurality of analog-to-digital (ADC) circuits 375, and the digital signal is then refined by DSP 380 (e.g., undergoes equalization) within the ASIC 305. The DSP processed signal is then converted from symbol format to binary format using the symbol-to-binary mapping circuits 385. Each of the binary signals then undergoes binary FEC decoding to correct errors. The error corrected data is then further processed using the application specific circuits of the ASIC 305 (e.g., switch ASIC) as discussed above in FIG. 1. One advantage of the CDI-PAM architecture 300 includes flexibility to scale to higher data rates by increasing modulation formats (e.g., from PAM-4 to PAM-16) without increasing the number of data lines and electrical circuits. Additionally, by including error correction and signal refinements in the ASIC (e.g., FEC encoding/decoding and DSPs), errors arising from in-chip sources (e.g., en-route from the CPO module 340 to ASIC 305) can be corrected and/or avoided, thereby enabling higher data rates in a co-packaged power-efficient configuration.

Figure 4:
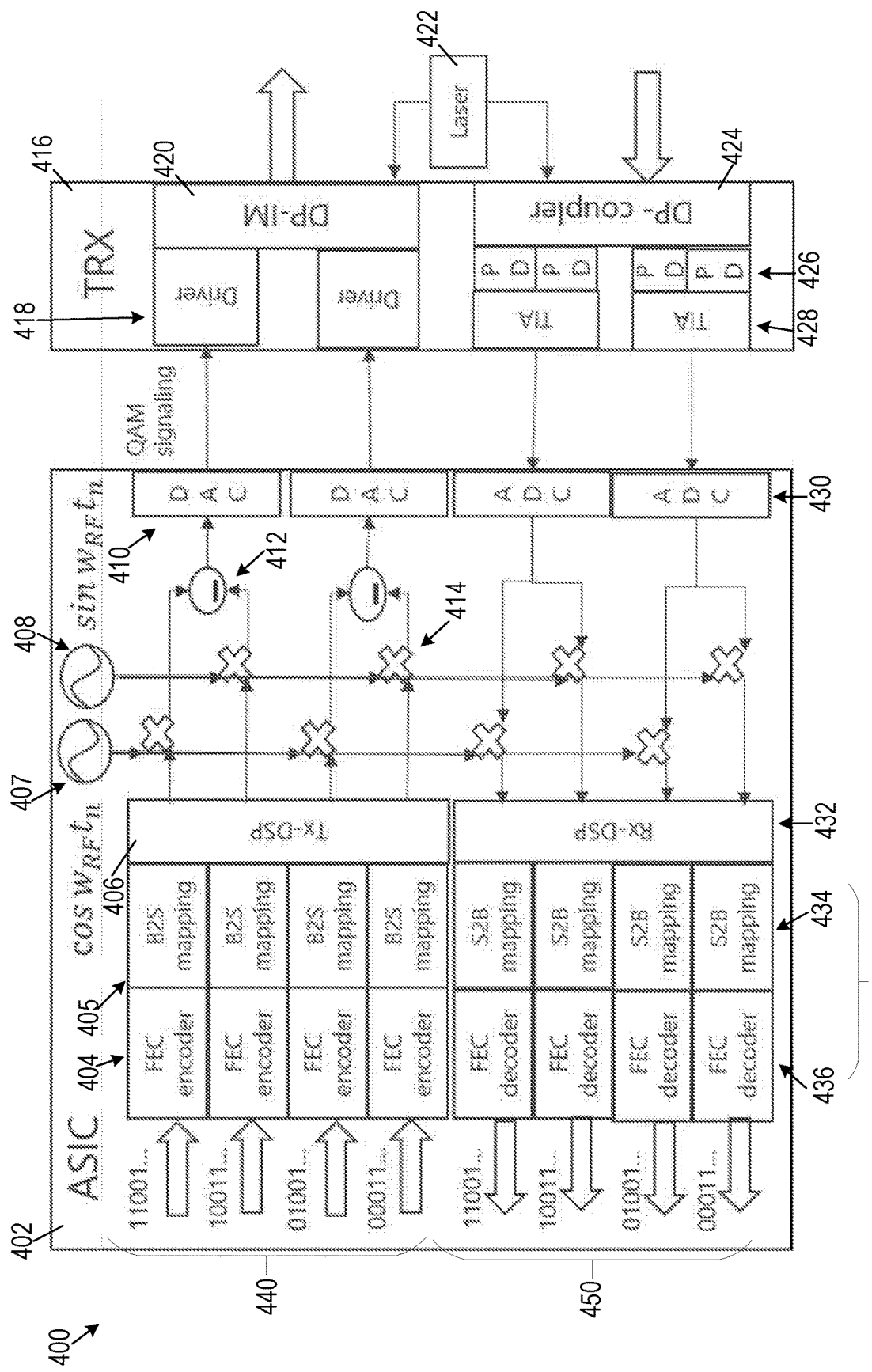
FIG. 4 shows an example quadrature amplitude modulation (QAM) signaling based electrical interface architecture, according to some example embodiments.

FIG. 4 shows an example co-packaged optical CDI-QAM architecture 400 implementing radio frequency m-ary quadrature amplitude modulation (RF-MQAM), according to some example embodiments. In the illustrated embodiments, the ASIC 402 is an example implementation of ASIC 105 or ASIC 215 that is connected to CPO module 416 (e.g., an optical transceiver, transceiver 115 in FIG. 1, PIC 220 in FIG. 2) via electrical paths (e.g., integrated electrical circuit paths 223, electrical connections through copper pillars 214 and organic substrate 260), over which data is transmitted in QAM signaling format. As illustrated, the ASIC 402 includes a transmitter portion 440 and receiver portion 450, each having four binary lanes. In the transmitter portion 440 each data line undergoes forward error correction (FEC) encoding by an FEC encoder 404, and is converted from binary to symbols by binary-to-symbol mapping modules 405. Each of the data lines in the transmitter portion 440 then undergoes digital signal processing by a digital signal processing module 406. In some example embodiments, the digital signal processing module 406 includes one or more data processing components to improve the data quality of a given lane (e.g., a plurality of equalizers, a MIMO DSP). Each of the four lanes of data in the transmitter portion 440 receives I signal and Q signal up-conversion from a first signal generator 407 (e.g., a cosine RF source) and a second signal generator 408 (e.g., sinusoidal RF source), respectively, using multipliers, such as multiplier 414. The Q and I signals are then subtracted in pairs using subtractor or difference circuits, such as subtractor 412. The pairs of QI lines are then converted from digital data to analog signal by a plurality of DACs 410. The four data lines of data is then transmitted as QAM signaling (e.g., QAM-16, QAM-64) from the ASIC 402 to a CPO module 416 using two electrical paths on the opto-ASIC co-packaged architecture chip 100.

The CPO module 416 implements one or more optical modulators to modulate a plurality of optical beams with PM-QAM optical signaling for transmission out of the opto-ASIC co-packaged architecture chip 100. For example, a modulator driver 418 for each data line uses the QAM electrical signaling to drive an optical modulator 420 (e.g., a dual polarization intensity modulator (DP-IM)) to generate modulated light for transmission. In the illustrated example, a laser 422 (e.g., an external laser, a laser integrated into the CPO module 416) can generate the light for modulation and transmission, and additionally for demodulation by the receiver components in a coherent QAM configuration.

The CPO module 416 can receive PM-QAM light for processing. In some example embodiments, the modulated light is received by a coupler 424 (e.g., a dual polarization coupler). A plurality of photodetectors 426 (e.g., photodiodes) to convert the light to electrical signal (e.g., differential signal). The electrical signals are then amplified by a plurality of TIAs 428 for transmission to the ASIC 402 in QAM signaling format.

The ASIC 402 receives the electrical QAM signals and converts it from analog to digital signal using a plurality of ADCs 430, which is then down-converted to baseband I and Q branch signals via the first signal generator 407 and the second signal generator 408. The separated and down-converted signals are then refined by DSP 432 within the ASIC 402. The DSP processed signal is then converted from symbol format to binary format using the symbol-to-binary converters 434. Each of the binary signals then undergoes binary FEC decoding by the FEC decoders 436 to correct errors. The error corrected data is then further processed using the application specific circuits of the ASIC 402 (e.g., switch ASIC) as discussed above in FIG. 1.

As discussed above, an advantage of the CDI-QAM architecture 400 includes flexibility to scale to higher data rates by increasing modulation formats (e.g., from QAM-16 to QAM-64) without increasing the number of data lines and electrical circuits required to handle increased data lines. Additionally, by including error correction and signal refinements in the ASIC (e.g., FEC encoding/decoding and DSPs), errors arising from in-chip sources (e.g., en-route to and from the CPO module 416 to ASIC 402) can be corrected and/or avoided, thereby enabling higher data rates in a co-packaged power-efficient configuration. Further, as the electrical interface is further simplified with reduced number of electrical lanes and components (e.g., ADC/DACs), the CDI-QAM architecture can yield the maximum beachfront density (e.g., increase density of components along the edges), while using minimal power consumption of the electrical interface, according to some example embodiments.

Figure 5A:
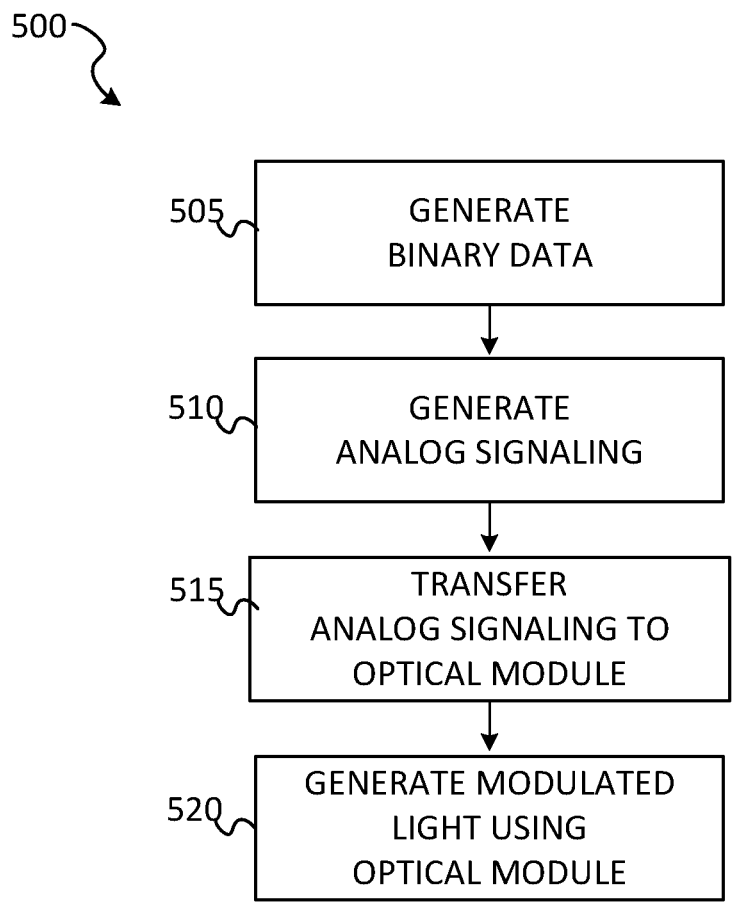
FIG. 5A show a flow diagram of a method for generating modulated light using a power efficient and scalable co-packaged optics (CPO) architecture, according to some example embodiments.

FIG. 5A shows a flow diagram of a method 500 for generating modulated light using a co-packaged architecture, according to some example embodiments. At operation 505, binary data is generated by an ASIC of the co-packaged architecture. For example, the ASIC can be a Ethernet switch ASIC which receives or otherwise generates data to be routed. In some example embodiments, the generated data undergoes error correction encoding by one or more FEC blocks and digital signal processing by one or more DSP blocks in the ASIC to generate digital signal. In some example embodiments, the ASIC includes a symbol mapping circuit that maps binary data to symbols, such as a PAM or QAM symbols. In some example embodiments, the signal is further up-converted and combined using one or more RF generators (e.g., first signal generator 407, second signal generator 408), as discussed above with reference to FIG. 4.

At operation 510, analog signaling is generated using one or more digital to analog circuits integrated in the ASIC (e.g., DACs 335, DACs 410). At operation 515, the analog electrical signaling is transferred to one or more optical modules. For example, a set of integrated electrical paths connecting the ASIC and the optical modules is used to transfer the signaling to one or more of the plurality of optical modules, such as one or more co-packaged optical transceivers.

At operation 520, modulated light is generated by one or more of the optical modules. For example, a co-packaged optical transceiver can receive PAM or QAM signaling and implement a modulator driver (e.g., modulator driver 337, modulator driver 418) to modulate light using one or more optical modulators (e.g., optical modulator 343, optical modulator 420). In some example embodiments, the light is generated on-chip by an integrated light source (e.g., a hybrid light source formed in an optical transceiver from III-V material), while in other example embodiments, the light for modulation is generated using an external laser (e.g., laser 345, laser 422) and received via one or more optical connections (e.g., fiber connections). The generated modulated light may then be transmitted or otherwise transferred out of the co-packaged chip using an optical port. For example, the co-packaged chip can be connected to an optical network via one or more fiber optic cables and the modulated light can be directed to one or more external or remote devices over the optical network.

Figure 5B:
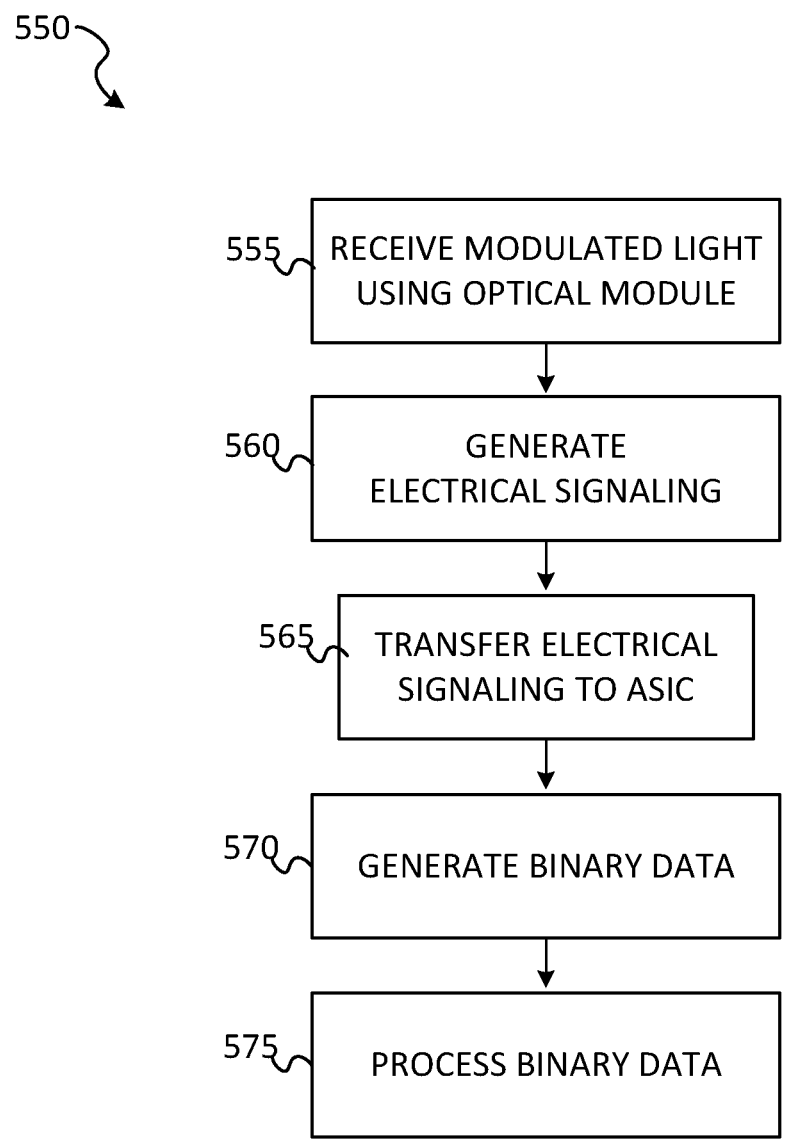
FIG. 5B show a flow diagram of a method for receiving modulated light using a power efficient and scalable CPO architecture, according to some example embodiments.

FIG. 5B shows a flow diagram of a method 550 for receiving and processing modulated light using a co-packaged architecture, according to some example embodiments. At operation 555, modulated light is received using one or more of the optical modules. For example, a given optical module can be a co-packaged optical transceiver connected to an optical network through which the modulated light is received from an external device. At operation 560, electrical signal is generated. In some example embodiments, the optical modules include one or more photodetectors (e.g. photodetector 365, photodetector 426) to convert the modulated light into photocurrent (e.g., electrical signaling exhibiting distortion) which is then amplified by one or more trans-impedance amplifiers integrated in the optical modules (e.g., transimpedance amplifiers 370, transimpedance amplifiers 428).

At operation 565, electrical signaling is transferred to the ASIC. For example, integrated electrical paths connecting the co-packaged ASIC in the CPO modules is used to transfer the electrical signal to the ASIC (e.g., electrical signaling exhibiting severe distortion for processing and refinement by the DSP and decoders). At operation 570, binary data is generated by the components of the ASIC. For example, the ASIC converts the received electrical signaling from an analog format to a digital format using an analog to digital converter circuit (e.g., ADC 375, ADC 430). The converted digital signaling can further be converted from symbols to binary data using mapping circuits (e.g., symbol-to-binary mapping circuits 385, symbol-to-binary mapping converters 434). Further, the data may be processed using DSPs (e.g., DSP 380, DSP 432) and FEC decoding by the FEC decoders 390 to correct errors (e.g., errors arising in transfer between the optical modules and the ASIC). At operation 575 the binary data is processed by the ASIC. For example, after the binary data has been refined an error correction has been implemented, the ASIC may process the data according to the application-specific circuits included in the given ASIC. For example, the ASIC may be a switch ASIC that routes the received binary data (e.g., packets) to another optical module for conversion to optical modulated light for transmission to another external device (e.g., via the optical network).

The following are example embodiments:

Example 1. A method comprising: generating data by an application specific integrated circuit (ASIC) of a co-packaged optical-electrical chip, the co-packaged optical-electrical chip comprising one or more co-packaged optical modules connected to the ASIC by integrated electrical paths; forward error correction (FEC) encoding the data by a plurality of FEC encoders in the ASIC; generating digital signal by mapping the data to symbol data by a plurality of symbol encoding circuits in the ASIC and refining the symbol data using a digital signal processing circuit in the ASIC; converting the digital signal to analog electrical signal using a plurality of digital to analog converters in the ASIC; transferring the analog electrical signal from the ASIC to co-packaged optical module using the integrated electrical paths in the co-packaged optical-electrical chip; and generating, using the one or more co-packaged optical modules, optical signal from the analog electrical signal by using the analog electrical signal to drive an optical modulator in the one or more co-packaged optical modules.

Example 2. The method of example 1, wherein the digital signal is in digital format.

Example 3. The method of any of examples 1 or 2, wherein the analog electrical signal transferred over the integrated electrical paths from the ASIC to the one or more co-packaged optical modules is in an analog format.

Example 4. The method of any of examples 1-3, further comprising: transmitting the optical signal using the one or more co-packaged optical modules.

Example 5. The method of any of examples 1-4, further comprising: receiving additional optical signal using the one or more co-packaged optical modules.

Example 6. The method of any of examples 1-5, wherein the one or more co-packaged optical modules generate the optical signal and detect the additional optical signal using a laser.

Example 7. The method of any of examples 1-6, wherein the laser is an external laser that couples light into the co-packaged optical-electrical chip using one or more optical connections.

Example 8. The method of any of examples 1-7, further comprising: generating additional analog electrical signal by converting the additional optical signal using one or more photodetectors in the one or more co-packaged optical modules.

Example 9. The method of any of examples 1-8, further comprising: transferring the additional analog electrical signal to the ASIC using the integrated electrical paths.

Example 10. The method of any of examples 1-9, further comprising: converting, by a plurality of analog to digital converters in the ASIC, the additional analog electrical signal to additional digital signal.

Example 11. The method of any of examples 1-10, wherein the digital signal processing (DSP) circuit is a multi-in-multi-out (MIMO) DSP.

Example 12. The method of any of examples 1-11, further comprising: generating, from the additional digital signal, additional data using an additional MIMO DSP and symbol decoding circuits in the ASIC; and FEC decoding the additional data using a plurality of FEC decoders in the ASIC.

Example 13. The method of any of examples 1-12, further comprising: processing the additional data using circuitry in the ASIC.

Example 14. The method of any of examples 1-13, wherein the integrated electrical paths are in a centralized digital integration-pulse amplitude modulation (CDI-PAM) electrical interface that transfers the analog electrical signal from the ASIC to the one or more co-packaged optical modules.

Example 15. The method of any of examples 1-14, wherein the integrated electrical paths are in a centralized digital integration-quadrature amplitude modulation (CDI-QAM) electrical interface that transfers the analog electrical signal from the ASIC to the one or more co-packaged optical modules.

Example 16. A co-packaged optical-electrical chip comprising: an application specific integrated circuit (ASIC) to generate data, the ASIC including a plurality of symbol encoding circuits to convert the data to symbol data, the ASIC including a digital signal processing circuit to refine the symbol data, the ASIC including a plurality of digital to analog converters (DACs) to convert digital signal to analog electrical signal, the ASIC connected to components of the co-packaged optical-electrical chip by integrated electrical paths; and one or more co-packaged optical modules to receive the analog electrical signal from the ASIC using the integrated electrical paths, the one or more co-packaged optical modules including an optical modulator to generate optical signal from the analog electrical signal.

Example 17. The co-packaged optical-electrical chip of example 16, wherein the symbol data generated by the plurality of symbol encoding circuits is in digital format.

Example 18. The co-packaged optical-electrical chip of any of examples 16 or 17, wherein the ASIC comprises a plurality of digital to analog converters to convert the digital signal from the digital format to an analog format, wherein the analog electrical signal is transferred over the integrated electrical paths to the one or more co-packaged optical modules in the analog format.

Example 19. The co-packaged optical-electrical chip of any of examples 16-18, wherein the one or more co-packaged optical modules receive additional optical signal.

Example 20. The co-packaged optical-electrical chip of any of examples 16-19, wherein the one or more co-packaged optical modules comprises one or more photodetectors to generate electrical analog signal from the additional optical signal.

In the foregoing detailed description, the method and apparatus of the present inventive subject matter have been described with reference to specific exemplary embodiments thereof. It will, however, be evident that various modifications and changes may be made thereto without departing from the broader spirit and scope of the present inventive subject matter. The present specification and figures are accordingly to be regarded as illustrative rather than restrictive.

What is claimed is:

1. A method comprising:
   generating data by an application specific integrated circuit (ASIC) of a co-packaged optical-electrical chip, the co-packaged optical-electrical chip comprising one or more co-packaged optical modules connected to the ASIC by integrated electrical paths that are in a pulse amplitude modulator (PAM) electrical interface of the co-packaged optical-electrical chip;
   forward error correction (FEC) encoding the data by a plurality of FEC encoders in the ASIC;
   generating digital signal by mapping the data to symbol data by a plurality of symbol encoding circuits in the ASIC and refining the symbol data using a digital signal processing circuit in the ASIC;
   converting the digital signal to analog electrical signal using a plurality of digital to analog converters in the ASIC;
   transferring the analog electrical signal from the ASIC to the one or more co-packaged optical modules using the integrated electrical paths of the PAM electrical interface in the co-packaged optical-electrical chip; and
   generating, using the one or more co-packaged optical modules, optical signal from the analog electrical signal by using the analog electrical signal to drive an optical modulator in the one or more co-packaged optical modules.

2. The method of claim 1, wherein the digital signal is in digital format.

3. The method of claim 1, wherein the analog electrical signal transferred over the integrated electrical paths from the ASIC to the one or more co-packaged optical modules is in an analog format.

4. The method of claim 1, further comprising:
   transmitting the optical signal using the one or more co-packaged optical modules.

5. The method of claim 4, further comprising:
   receiving additional optical signal using the one or more co-packaged optical modules.

6. The method of claim 5, wherein the one or more co-packaged optical modules generate the optical signal and detect the additional optical signal using a laser.

7. The method of claim 6, wherein the laser is an external laser that couples light into the co-packaged optical-electrical chip using one or more optical connections.

8. The method of claim 5, further comprising:
generating additional analog electrical signal by converting the additional optical signal using one or more photodetectors in the one or more co-packaged optical modules.

9. The method of claim 8, further comprising:
transferring the additional analog electrical signal to the ASIC using the integrated electrical paths.

10. The method of claim 9, further comprising:
converting, by a plurality of analog to digital converters in the ASIC, the additional analog electrical signal to additional digital signal.

11. The method of claim 10, wherein the digital signal processing (DSP) circuit is a multi-in-multi-out (MIMO) DSP.

12. The method of claim 11, further comprising:
generating, from the additional digital signal, additional data using an additional MIMO DSP and symbol decoding circuits in the ASIC; and
FEC decoding the additional data using a plurality of FEC decoders in the ASIC.

13. The method of claim 12, further comprising:
processing the additional data using circuitry in the ASIC.

14. A co-packaged optical-electrical chip comprising:
an application specific integrated circuit (ASIC) to generate data, the ASIC including a plurality of symbol encoding circuits to convert the data to symbol data, the ASIC including a digital signal processing circuit to refine the symbol data, the ASIC including a plurality of digital to analog converters (DACs) to convert digital signal to analog electrical signal, the ASIC connected to components of the co-packaged optical-electrical chip by integrated electrical paths that are in a pulse amplitude modulator (PAM) electrical interface of the co-packaged optical-electrical chip; and
one or more co-packaged optical modules to receive the analog electrical signal from the ASIC using the integrated electrical paths of the PAM electrical interface, the one or more co-packaged optical modules including an optical modulator to generate optical signal from the analog electrical signal.

15. The co-packaged optical-electrical chip of claim 14, wherein the symbol data generated by the plurality of symbol encoding circuits is in digital format.

16. The co-packaged optical-electrical chip of claim 15, wherein the ASIC comprises a plurality of digital to analog converters to convert the digital signal from the digital format to an analog format, wherein the analog electrical signal is transferred over the integrated electrical paths to the one or more co-packaged optical modules in the analog format.

17. The co-packaged optical-electrical chip of claim 14, wherein the one or more co-packaged optical modules receive additional optical signal.

18. The co-packaged optical-electrical chip of claim 17, wherein the one or more co-packaged optical modules comprises one or more photodetectors to generate electrical analog signal from the additional optical signal.

19. The co-packaged optical-electrical chip of claim 14, wherein the digital signal processing (DSP) circuit is a multi-in-multi-out (MIMO) DSP.

20. The co-packaged optical-electrical chip of claim 14, further comprising one or more optical couplers to output the optical signal from the co-packaged optical-electrical chip.

* * * * *